United States Patent

Barbier

[15] 3,698,009
[45] Oct. 10, 1972

[54] PROCESS FOR MEASURING THE SAMPLED AMPLITUDE OF A SEISMIC SIGNAL

[72] Inventor: Maurice Barbier, Ousse, France

[73] Assignee: Societe National des Petroles D'Aquitaine Tour Aquitaine, Paris, France

[22] Filed: Oct. 21, 1970

[21] Appl. No.: 82,708

[30] Foreign Application Priority Data

Nov. 28, 1969 France.....................6941157

[52] U.S. Cl......340/15.5 CP, 340/15.5 DP, 340/15.5 R, 346/33 C
[51] Int. Cl. ............................................G01v 1/28
[58] Field of Search.340/15.5 CC, 15.5 CP, 15.5 DP; 346/33 C

[56] References Cited

UNITED STATES PATENTS

| | | | |
|---|---|---|---|
| 3,601,790 | 8/1971 | Sasseen | 340/15.5 CP |
| 3,142,750 | 7/1964 | Silverman et al. | 340/15.5 CP |
| 3,449,047 | 6/1969 | Hartmann | 346/33 C |
| 2,767,389 | 10/1956 | McCollum | 340/15.5 |

FOREIGN PATENTS OR APPLICATIONS 956,431  4/1964  Great Britain......340/15.5 CP

*Primary Examiner*—Benjamin A. Borchelt
*Assistant Examiner*—H. A. Birmiel
*Attorney*—Holcombe, Wetherill & Brisebois

[57] ABSTRACT

A process for measuring the sampled amplitude of a seismic signal received by a sensing device after the said signal has travelled through a continuous medium, in which the content of an adding counter for each basic unit of time is compared in turn with the contents of each of a first series of memories, containing, in digital form, the instants of emission of a sequence of energy impulses, in which the sampled digital value of the signal supplied by the sensor is received in another series of memories, the elements of which are identified in relation to the time, and in which each sample is given a number of addresses determined by the instant of sampling and the various instants of prior emissions preceding the instant of sampling, with a period shorter than the maximum time taken for the mechanical waves to travel through the ground.

10 Claims, 6 Drawing Figures

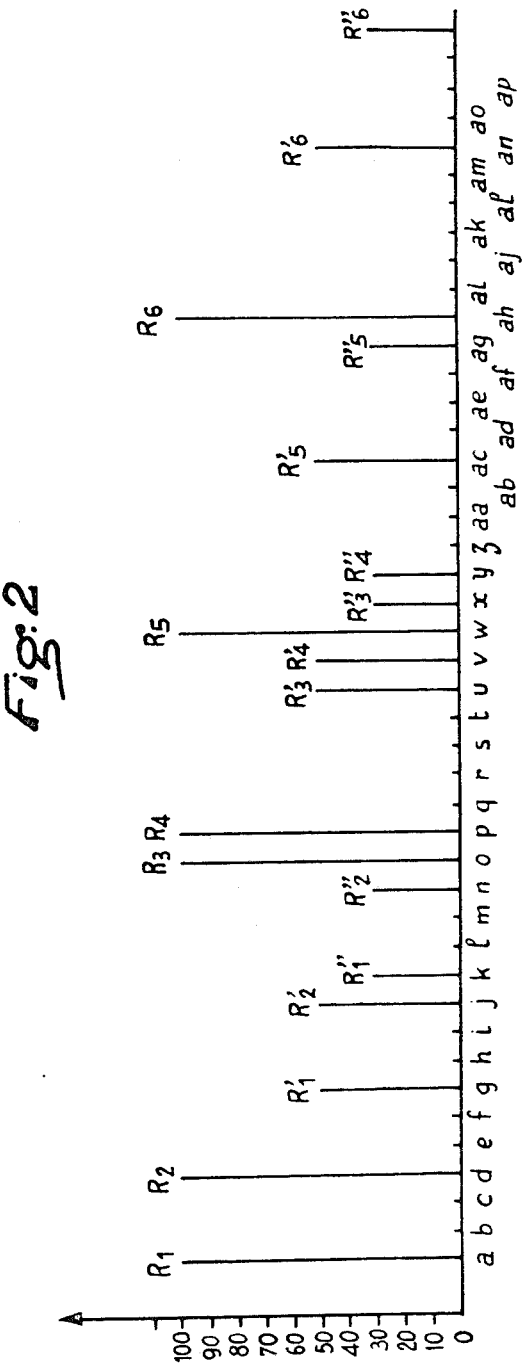

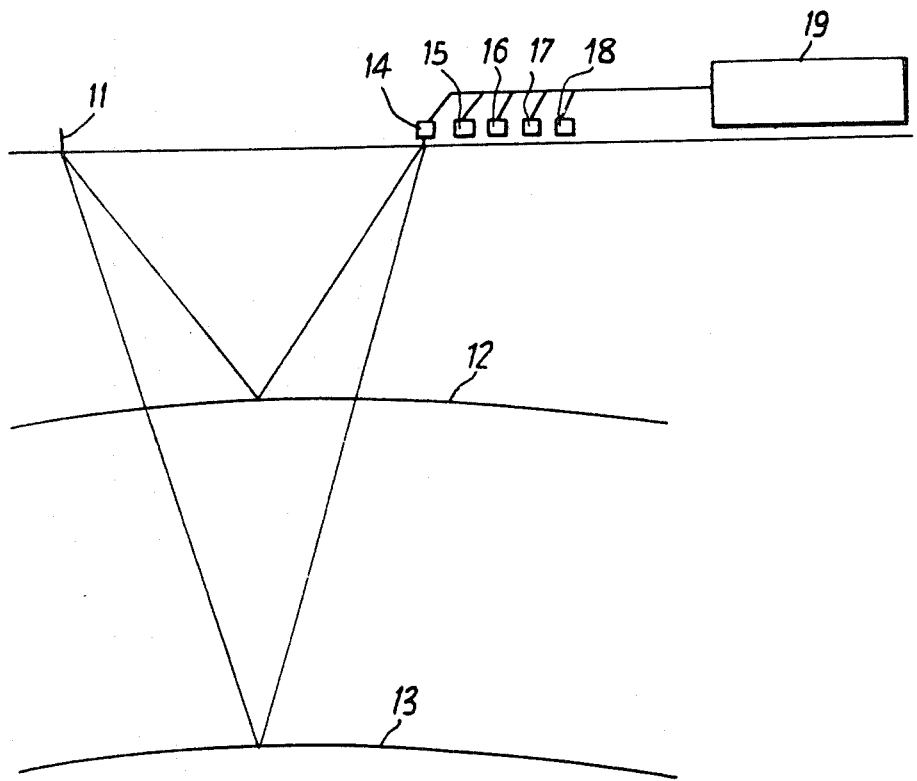

PROCESS FOR MEASURING THE SAMPLED AMPLITUDE OF A SEISMIC SIGNAL

The present invention relates to a process and device for the simultaneous recording and processing of seismic indications following emission of mechanical waves in a continuous medium.

A method already known is the process of seismic emission by impulses, in which a series of impulses emitted in accordance with a predetermined pattern is transmitted to a continuous medium; the series has a limited duration, but which is definitely higher than the maximum time taken for a mechanical wave to travel between the point of emission and the various reception points.

The information then has to be recorded, as received by sensing devices acted upon by the mechanical waves emitted by the transmitting device and reflected by discontinuities in the medium under investigation, during a period at least equal to the period of emission, plus the maximum time taken by the mechanical waves to travel through the continuous medium.

Assuming that the impulses are emitted at moments separated by multiple deviations from a basic unit of time, and that the data resulting from the said impulses are recorded by means of a digital recording device, it is necessary to have a number of recording words at least equal to the number of basic time units contained in the duration of emission of the signal, plus the maximum travelling time.

This leads to enormous quantities of data recordings, in particular where the continuous recording method described in French patent No. 1,583,239 is employed.

This data is then processed by intercorrelation, on a computer, for instance, and a much shorter recording is drawn from it, equal in duration to the maximum travelling time sought, defined as the difference between the reception time and the emission time.

The process according to the present invention does away with the need for the intercorrelating operation and the recording of this large quantity of data, by reducing the volume of data actually recorded, thus using only a limited number of words, or items of information in digital form, the said number being equal at most to the number of basic time units contained in the maximum time taken by the mechanical waves to travel through the ground.

This in itself reduces the volume and cost of recording, as well as the time needed to read the data obtained by seismic prospecting of the continuous medium.

The process according to the present invention is characterized in that an elementary unit of time is set up by means of a clock, that a synchronization signal is given at the end of each elementary unit of time, that the number of synchronization signals thus emitted is counted in an adding counter, that for each basic unit of time the contents of this adding counter are compared in turn with the contents of each of the memories in a first series in which are recorded the numbers defining the moments at which an energy impulse is to be emitted, that by means of the comparison, when it shows equality, a signal for the emission of energy is given, that the instantaneous value, at the instant of sampling, of the energy detected by a sensor after reflection against the discontinuities of the ground and converted into a digital form is received in another series of memories consisting of a number of elements, each of which is identified by an address, that each sample is given a number of addresses determined by the instant of sampling and the various instants at which previous emissions have taken place, the said emissions being separated from the instant of sampling by a period lasting not more than the maximum time taken by the mechanical waves to travel through the ground.

According to another feature of the invention, the samples put into the form of digital values are added in each of the appropriate memories to the values already to be found there, and at the end of the emission time the total value in each of the memories is transferred to a magnetic tape moving at a uniform speed, the content of each memory being registered spatially on the magnetic tape, which moves for a period equal to the maximum travelling time, the instant attributed to each memory thus giving the temporal position of the signal received by a sensor, and the value of the contents of the memory defining the amplitude of the reflected waves.

In one particular embodiment, most commonly employed, more than one mechanical energy sensing device is used, each sensor being connected in turn by a cyclic contactor to a series of memories, each series being read separately and the contents of the various memories being recorded sequentially on a magnetic tape.

The invention also relates to the device for application of the process described above, containing, for one group of sensors, a first series of memories, each of which contains a given number of digits, in which is recorded, in digital form, the series of instants determining the sequence of impulse emissions, a second series of memories with the same composition as the first series, in which is recorded, in the course of time, the sequence of emission instants, the said sequence being confined to a period which is at most equal to the maximum travelling time and shifting in time, a third series of memories with the same composition as the previous series, in which are registered the digital values of the signal received by the sensor, sampled for each basic time unit, digitally coded and addressed to the different memories in relation to the relative temporal position of the signal sample to the emission instants preceding the instant of sampling with a period shorter than the maximum time taken for the mechanical wave to travel through the ground, the said instants being contained at the instant under consideration in the second series of memories, an arithmetic unit to carry out the necessary additions and substractions, connected at each arrival of a sample to the second series of memories, determining the addresses to which the incoming sample is to be directed, being connected to the corresponding memories in the third series, fetching from each memory in turn the values contained in them, adding up in turn the values taken and the values of the sample and redirecting the resulting sum to the memory from which the values have been taken, a synchronization generator defining the basic time unit and emitting a synchronization signal for each time unit, an adding counter receiving the generator signals and defining the time that has passed since the start of the operation, a digital comparator receiving on the one hand the content of the adding counter and on the other hand the contents in turn of the different memories in the first series, and when equality occurs setting off an impulse, a transfer unit connected in turn to the different memories in the first series and cyclically to the different memories in the second series, connection of the different memories with one another through the transfer unit being effected by the digital comparator whenever the said comparator registers equality, a subtracting counter receiving the content of the adding counter and substracting, of a finite number corresponding to the value in basic time units of the maximum time taken by the mechanical waves to travel through the ground from the contents of the adding counter, a second digital comparator receiving, on the one hand, the content of the subtracting counter and, on the other hand, in turn, through a connection unit, the contents of the memories in the second series, and re-setting to zero, after a certain period, the content of the memory consulted and changing over to the next memory, the arithmetic unit receiving the content of the adding counter and computing the difference between the instantaneous content of the adding counter and each of the series of contents of the memories in the second series in turn, the basic time unit generator controlling a sampler which determines the instantaneous value of the signal received by the group of sensors sensitive to the mechanical waves, transferring this value to an analogue-to-digital converter, this digital value subsequently being transferred to the arithmetic unit, the said arithmetic unit computing the differences in turn between the content of the adding counter and the different contents of the memories in the second series, determining the memories of the third series, the positions of which correspond to the differences computed, the said arithmetic unit then fetching in turn the contents of the memories thus determined, producing the sum of the contents of these different memories and of the digital value of the signal at the instant under consideration, the results and sums being redirected into the corresponding memories.

In a more elaborate version of this device, the contents of the memories in the third series are transferred at the end of each emission to a magnetic tape with several tracks, each track corresponding to the different digits of each memory, the said magnetic tape beginning to advance as soon as a third comparator registers equality between the time that has passed since the start of emission and a predetermined time set in a subsidiary counter defining the total duration of emission, the said tape advancing for a fixed period of time, defined by a binary unit, corresponding to the maximum time taken for the mechanical waves to travel through the ground.

In an improved version of this device, the third series of memories is replaced by a third category consisting of a number of identical series of memories, the exact number being dependent on the number of separate groups of sensors.

In this version, a multiple-input contactor receives the electrical signals supplied by the groups of mechanical energy sensors, the said contact changing over cyclically to the circuits of each group of sensors, receiving in turn for the duration of one basic time unit the samples of the instantaneous value of each of the electrical signals, transferring these samples to an analogue-to-digital converter converting the signal delivered by each group of sensors into a digital value and supplying the arithmetic unit with the sampled digital values, at the same time as the contactor is selecting each of the matching series of third-category memories, in order to link them up with the arithmetic unit.

It will be easier to understand the invention from reading the following description of one simplified embodiment of the process, and the description of one simplified embodiment of the device, and then of an actual embodiment.

These various descriptions are illustrated by FIGS. 1, 2, 3, 3a, 4 and 5, and by tables I and II.

FIG. 1 shows a six-signal emission diagram.

FIG. 2 shows the sequence of sampled digital values of a diagrammatic signal received by a sensor, the sampling time being equal to the basic unit of time.

Table I shows a diagram of the relationship between each of the samples and each energy emission.

Table II shows the amplitude of each of the signals identified in table I, correspondence being by line and column.

Figure 3:
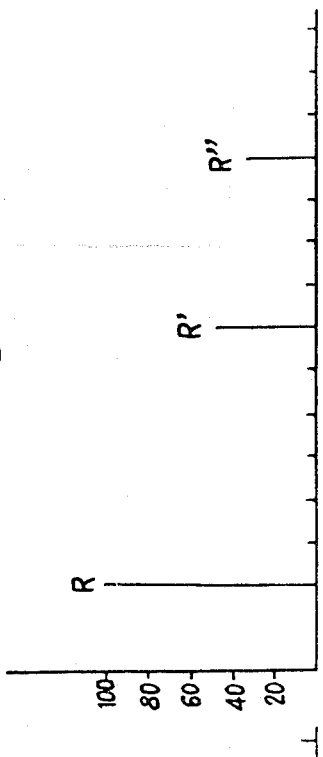
Figure 3A:
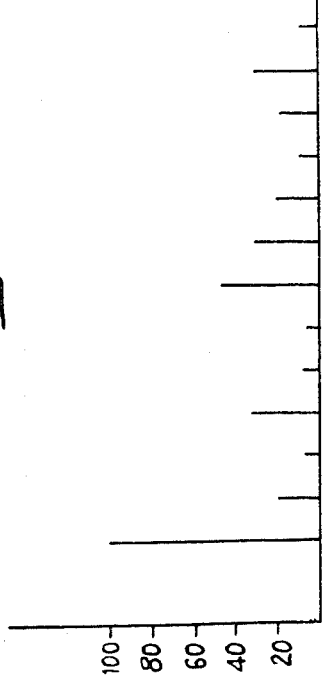

FIG. 3 shows the recording resulting from application of the process for 6 emissions, while FIG. 3a shows the same recording for a number of emissions laid down in French patent No. 1,582,534.

FIG. 4 shows the path of the mechanical waves, for one point of emission 11 and one sensing device 14 after being reflected by horizons 12 and 13. In particular, it shows 3 levels situated at 0, 6 and 10 basic time units.

Figure 5:
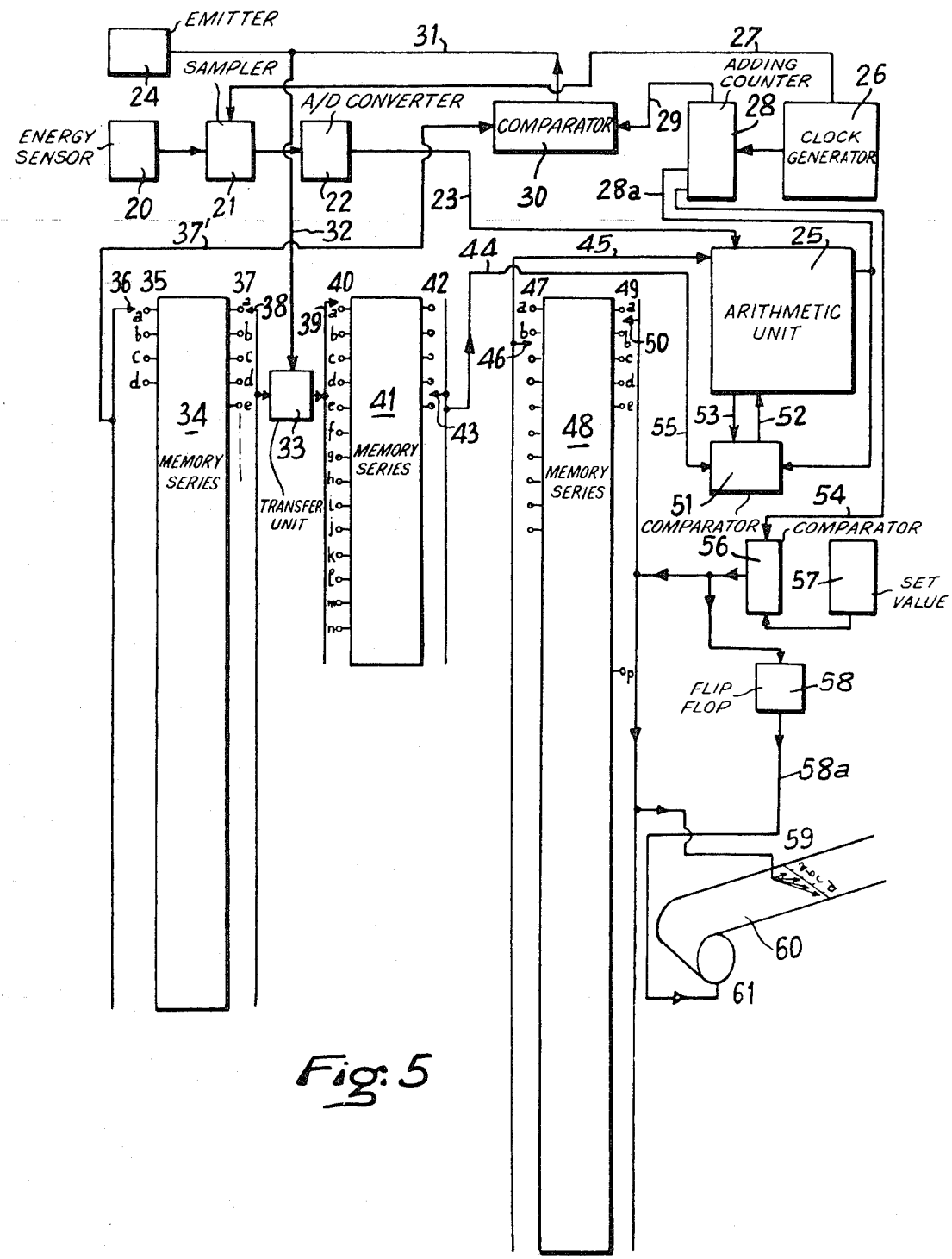

FIG. 5 shows the diagram of a recorder receiving the signals from one group of sensors.

Table I shows the distribution of the samples among the various memories in relation to the various emissions.

Table II shows the values contained in these memories; these values increase in time, in the course of the emission.

On FIG. 1, six upright rectangles represent six successive emissions of energy, at instants corresponding to 0, 3, 14, 15, 22 and 33 basic units of time.

The duration of the emission is therefore 33 basic units of time. The maximum time taken by the waves to travel through the ground is taken to be equal to 13 basic units of time.

FIG. 2 shows the samples of the signal received by a sensor.

The samples received are identified by the references $a \ldots z, aa \ldots au$. They occur in digital form in this order at a recorder input, in other words the sample value of the signal is given in number of voltage levels. The diagram shows signals ranging from 0 to 100 voltage levels.

With conventional recording, the signals would be recorded in turn and would then be processed by intercorrelation of the signals in FIGS. 1 and 2, using a computer, for instance, so as to reconstitute the signal received corresponding to a single emission.

In the present invention, in contrast, the signals are addressed to various memories, as follows: the first emission of energy starts up the appliance. At instant 0, the voltage being delivered by the sensor receiving the first wave is sampled.

Sampling for the following basic time unit $b$ gives the value 0 in the diagrammatic example chosen.

At the end of the second basic unit, the value sampled at $c$ is also nil. These values are registered in the three memories $a$, $b$ and $c$ of the third series, after passing through the arithmetic unit. They result from emission 1.

For the 4th basic time unit following emission 1, emission 2 occurs, and a sample is then taken of the value of the signal produced by emission 1 for the 4th basic time unit, to which is added the value of the signal resulting from emission 2 at the start of the fourth basic time unit, which is the first basic time unit as counted from emission 2.

Two addresses in a memory are provided for this sample $d$, address $d$ for the time following the first emission and address $a$ for the time following the second emission. This is what the arithmetic unit does by computing the differences between the real times and emission times.

There are two addresses, one for four basic time units, or $d$, the other for 3 minus 3 basic time units, namely 1 basic time unit, or $a$.

The sample applies as long as the sampling time is less than the maximum travelling time. On the other hand, let us consider sample $y$: its value results from the third, fourth and fifth impulses. The first and second impulses no longer intervene, because the time that has passed between these impulses and the instant of sampling is greater than the maximum time taken by the mechanical waves to travel through the soil. But emissions 3, 4 and 5 intervene and determine three addresses: in a memory position corresponding to a first emission $k$ for the third emission, corresponding to $j$ for the fourth and corresponding to $c$ for the fifth. (See Table I) The digital value of the sample $y$ is then added to the values previously present in the memories: to $k$ (i.e. 60), producing 90 as the subsequent content of this memory position; to $j$ (i.e. 80), producing 110 as the subsequent content of this memory position; and to $c$ (i.e. 0), producing 30 as the subsequent content of this memory position. The process is pursued.

The total is worked out in the last line, and the average value of the contents of each memory is carried over on to FIG. 3, which thus gives the result in the form of the sequence of values sampled during the maximum time taken for the mechanical waves to travel through the soil.

FIG. 3a shows the same result for a large number of emissions, in accordance with the descriptions contained in the French patents referred to.

This figure shows three energy inputs only, R, R' and R'', the first corresponding to direct input for 0 basic time unit, the second after a period of six basic time units, the third after a period of 10 basic time units.

FIG. 4 shows the path followed by the waves emitted by the source 11 and received by the sensor 14, after being reflected by the horizons 12 and 13, situated at 6 and 10 basic time units.

Other sensors, 15, 16, 17 and 18, are also connected to the processing unit 19, but to make the drawing more comprehensible the other rays of the mechanical waves corresponding to these other sensors have not been shown.

The processing unit 19, shown in FIG. 5, is composed as follows: a mechanical energy sensor 20 receives signals which it converts into electrical quantities (voltage or current). This quantity is applied to the sampler 21, which, controlled by the generator 26, samples the quantity delivered by the sensor, directing it to the analogue-to-digital converter 22. This converter, which is conventional in design, converts the electrical quantity into a digital value, using the binary code, for instance. The same number of digits as there are tracks on the magnetic recording tape may be used. 7, 14 or 21 digits (or binary elements) are normally used, giving at least 8,000 coding levels. By line 23 the digital value is addressed to the arithmetic unit 25. The arrival of the digital value in this unit 25 sets off several more or less simultaneous operations, which will be described below.

The clock 26 defines the basic unit of time for the device, and emits electrical signals at the end of each such basic unit, controlling the sampler 21 by means of the line 27, as mentioned above.

In addition, the clock 26 sends its signals to an adding counter 28, which integrates them, thus defining the time that has passed since the starting-up of the clock 26, which controls the starting-up of the whole device.

By means of line 28a, the contents of the adding counter 28 are directed to the arithmetic unit 25. By line 29, these contents are directed to a digital comparator 30, with a recording value of nil. This comparator is also fed by the line 37', connected by a step-by-step selector 36 to the various inputs 35a, b, c ... j of a series of memories 34.

Before the device is set in motion, the instants at which the emitting device 24 is to emit an energy impulse are displayed in this series of memories, in the form of numbers of basic time units.

At 0 basic units, the first memory 35a is connected. When the comparator 30 detects equality between the content of 28 and the content of the memory 35a it emits a signal which operates the emitting device 24, by line 31; the selector 36 then advances one step, connecting up the memory 35b, and so on. The emission shown in FIG. 1 is thus produced.

In practice, a basic unit of time of 1, 2 or 4 milliseconds is used, and energy impulses are emitted by means of the emitting device 24, for 10 to 200 seconds, emitting from 10 to 10,000 energy impulses for each emission.

The signal delivered by the comparator 30 is also directed along the lines 31 and 32 to a transfer unit 33 connected on the one hand, by a step by step selector connected to the selector 36, to the series of memories 34, the outputs of which are 37a, b ... j, and on the other hand, by a selector 39, which is a step by step selector in loop form, to the inputs 40a, b ... n of a series of memories 41.

The sign delivered by the comparator 30 thus brings about the transfer of the content of the memory 35a to the memory 40a, of the memory 35b to the memory 40b, or the memory 35n to the memory 40n, and then of the memory 35n + 1 to memory 40a, the previous content of this memory being erased, and so on.

This means that the memory 41 contains the instants of emission preceding the instant of sampling, for a period shorter than the time taken by the mechanical waves to travel through the ground. The contents of the adding counter 28 are directed along the line 28a to the comparator 51, which is controlled by the line 53 from the arithmetic unit, being set off by the arrival at 25 of a digital value along line 23.

In addition, the comparator 51 is connected by the line 44 to a fast-switching step by step selector 43, which scans the contents of the series of memories 41, this switching being among the outputs 42a, b . . . n of these memories.

The comparator 51 therefore computes in turn, in a few tens of microseconds, the difference between the content of the counter 28 and the contents of the different memories in the series 41 containing values above zero. The result in a number of basic time units, which are addressed to the arithmetic unit 25 along the line 52. These various numbers select in turn, in increasing order of values, various memories in the series of memories 48. For example, one basic time unit selects the memory 47a, by means of the selector 46; six basic time units select the memory 47f; 26 basic time units select the memory 47z. Once the selector 46 is positioned, the arithmetic unit 25 fetches the content of the memory, containing as many digits as there are tracks on the magnetic tape, adds to these contents the digital value arriving from the line 23 and re-directs the total to the memory selected, then positions the selector 46 for the next operation, at 47z, for instance.

The series of memories 48 contains as many memories as there are basic time units contained in the maximum time taken by the mechanical waves to travel through the ground.

At the end of the operation, the sequence of various memories in the series 48 hold contents representing the amplitudes of the accumulated signals at times that are homologous in relation to emission times. These contents are shown in FIG. 3a. The make it possible to define the reflections of the mechanical waves in the ground.

In addition, the contents of the counter 28 are compared in the comparator 56 with a finite value 57 representing, in terms of a number of basic units of time, the total duration of the emission of energy impulses. When the comparator 56 shows equality, it sets off flip-flop 58, which by means of the line 58a starts up the motor 61 causing the magnetic tape 60 to advance. Simultaneously, by means of the line 55 it sets on the step by step selector 50, which is controlled by the cycle of the clock 26.

The memories 48 are thus read within a period equal to the maximum time taken for the mechanical waves to travel through the ground, the contents of each of them being recorded on the magnetic tape perpendicularly to the direction of movement by the magnetic heads 59a, b, c, d, there being as many recording heads as there are tracks on the magnetic tape and digits in each memory.

The device described above contained only one sensor or group of sensors.

In the case of multiple groups of sensors, a sequential contactor scanning all the groups of sensors during one basic time unit as defined by the clock 26 is inserted between the sampler 21 and the A-to-D converter 22. In this case there is more than one series of memories 48, the number depending on the number of sensors. The sequential contactor also switches from one to another of the series of memories 48 in accordance with the same cycle as the sensors.

After reading, there is a magnetic tape recording with the same characteristics as recordings on magnetic tape obtained by a single burst.

It operates as follows: the starting of the clock 26, the basic time unit of which is 2 milliseconds, for instance, causes feeding of the counter 28. The content of this counter is compared with the content of the memory 35a, previously loaded, in the series 34. When equality is registered, the emitting source 24 is acted upon, and it emits mechanical waves, in the ground or in the sea. These waves reach the sensor 20, producing an electrical voltage at the output, which is sampled every 2 milliseconds by the gate 21, then converted into coding levers or digitally quantized steps (approximately 8,000 for the maximum voltage, for example), and directed as digital valves to the unit 25. This unit acts on the comparator 51, which works out the difference between the contents of the sensor 28 and of the memory 43a in the series 41. Assuming that there has been only one impulse, the difference found at 51 shows the time between the instant of sampling and the instant of emission of the impulse, in other words the time taken by the mechanical wave to reach the sensor. Assuming that this is 20 milliseconds, for instance, the tenth memory (20/2 = 10) in the series 48 is connected up, through the arithmetic unit. Assuming that this memory is empty to start with, the voltage, converted into degrees, is addressed there, and entered in the memory.

Where there have been several impulses, the comparator 51 works out the differences in turn between the content of 28 and the sequence of memories 41 filled by the transfer unit 33 (the contents come from the memories 34, displaying the order of the bursts). This sequence is recorded in the arithmetic unit. The numbers found connect up the corresponding memories, in other words as many memories in the series 48 are connected as there have been bursts between the instant under consideration and the instant preceding it, for a duration equal to the maximum time taken for the mechanical waves to travel through the ground.

The value reaching the arithmetic unit 25 along the line 23 is addressed to the memories 48 as many times as there are memories connected.

Before directing it to each memory, the previous contents of these memories are called through the line 45 by the arithmetic unit 25.

This unit adds up the previous content of the memory and the value arriving through the line 23, then re-directs the total to the selected memory. The time taken for the whole of this operation is a few microseconds.

This sequence of operation is repeated as many times as there are memories selected from the series 48.

At the end of the time provided for the emission, determined by the content of the memory 57, the sequence stops. The instruction to stop is given by the comparator when the content of 28 is equal to the content of 57, which starts up the motor 61. The selector 50 scans each of the memories in the series 48 in turn, every 2 milliseconds.

The contents of the memories present in the binary elements operate the recording heads 59a, 59b, 59c and 59d, causing magnetization of the tape 60. This tape 60 advances during the maximum time taken for the mechanical waves to travel through the ground, corresponding to reading of all memories 48.

In a more elaborate version, the clock does not stop during reading of the memories; instead, a fresh series of emissions is set off immediately after the ending of the first series.

Recording on the magnetic tape causes dumping of all the memories in the series 48, which are subsequently filled by signals corresponding to the second series. It may therefore be seen that emission can be continuous while reception is intermittent. The magnetic tape 60 contains all the data of the seismic film. The contents of the magnetic tape are identical with the contents of a recording obtained with a single emission.

This continuous process is particularly useful at sea, where it allows much sharper definition of structures than previously possible with conventional sources.

What we claim is:

1. In a process for measuring the instantaneous amplitude of a seismic signal received by a sensing device after the said signal has travelled through a continuous medium, in which the amplitude of the signal received by the sensor is sampled at periodic times, emission of the signal from a signal source into the continuous medium occurring in the form of a sequence of energy impulses spaced out in time in accordance with a predetermined pattern, the improvement wherein
    A. an elementary unit of time is set up by means of a clock,
    B. a synchronization signal is given at the end of each elementary time unit,
    C. the number of synchronizing signals thus emitted is counted in an adding counter,
    D. the content of the said adding counter for each basic unit of time is compared in turn with the contents of each memory in a first series of memories in which are recorded the numbers defining the instants at which an energy impulses is to be emitted,
    E. When the comparison shows equality a signal for the emission of energy is given,
    F. the instantaneous value, at the instant of sampling, of the energy detected by a sensor after reflection against the discontinuities of the continuous medium and converted into a digital sample form is received in another series of memories consisting of a number of elements, each of which is identified by an address,
    G. each sample is given a number of addresses determined by the instant of sampling and the various instants at which previous emissions have taken place, the said emissions being separated from the instant of sampling by a period lasting not more than the maximum time taken by the signal to travel through the continuous medium from signal source to sensor.

2. A process according to claim 1, in which
    A. the digital samples are added, in each of the appropriate memories, to the values already found there and
    B. at the end of said period for said emissions the total value in each of the memories is transferred to a magnetic tape, the content of each memory being registered spatially on the magnetic tape, said tape advancing at a uniform speed for a period equal to maximum time of said travel, the instant attributed on said tape to the contents of each memory thus giving the temporal position of the signal received by a sensor, and the value of the content of the memory defining the amplitude of the processed signals.

3. A process according to claims 1, in which more than one mechanical energy sensing device is used, each sensor being connected in turn by a cyclic contactor to a series of memories forming part of a set of series of memories assembled in parallel, each series being read separately at the end of each operation and the contents of each memory in each series being recorded sequentially on a magnetic tape.

4. A device for measuring the instantaneous amplitude of a seismic signal after it has travelled through a continuous medium, said signal being introduced into said medium by a signal source as a predetermined pattern in time of energy impulses, a sensor being connected to measure the amplitude of a resulting signal in said medium, comprising
    A. a first series of memories, each of which can store a given number of digits, in which is recorded, in digital form, data defining the series of instants at which each of the sequence of impulse emissions is to take place,
    B. a second series of memories with the same composition as the first series for recording a sequence of possible emission instants, the said sequence of possible emission instants being confined to a period which is at most equal to the maximum travelling time of a signal from said signal sources to said sensor,
    C. a third series of memories with the same composition as the previous series for registering sampled digital values of the signal received by the sensor, said sampled values being sampled for each basic time unit, digitally coded and addressed to the different memories according to the temporal position of the signal sample relative to the instants of emission preceding the instant of sampling with a period shorter than the maximum time taken for the waves to travel through the medium, the said instants being contained at the instant under consideration in the second series of memories,
    D. an arithmetic unit for carrying out additions and subtractions, connected at each arrival of a sample to the second series of memories, for determining the addresses to which the incoming sample is to be directed, operative by being connected to the corresponding memories in the third series to fetch from each memory in turn the values contained in them, to add up in turn the values fetched and the values of the sample and to redirect the resulting sum to the memory from which the values were fetched,
    E. a synchronization generator for defining the basic time unit and for emitting a synchronization signal for each basic time unit,
    F. an adding counter receiving the synchronization signals and defining the time that has passed since the start of the operation, G. a digital comparator for receiving the content of the adding counter and the contents in turn of the different memories in the first series, and when equality occurs between its two received values, for setting off an impulse, H. a transfer unit connected in turn to the different memories in the first series and cyclically to the different memories in the second series for having connection of the different memories with one another through the transfer unit effected by the digital comparator whenever said comparator registers equality, I. a subtracting counter for receiving the content of the adding counter and for subtracting therefrom a finite number corresponding to the value in basic time units of the maximum time taken by the waves to travel through the medium, J. a second digital comparator for receiving the content of the subtracting counter and in turn, through a connection unit, the contents of the memories in the second series, and for re-setting to zero, after a certain time, the content of the memory in the second series to which connection was made and changing over to the next memory, the arithmetic unit receiving the content of the adding counter and working out the difference between the instantaneous content of the adding counter and each of the series of contents of the memories in the second series in turn, the basic time unit generator controlling a sampler, which determines the instantaneous value of the signal received by the group of sensors sensitive to the seismic signal, transferring this value to an analogue-to-digital converter, this digital value subsequently being transferred to the arithmetic unit, the said arithmetic unit computing the differences in turn between the content of the adding counter and the different contents of the memories in the second series, determining the memories of the third series, the positions of which correspond to the differences computed, the said arithmetic unit then fetching in turn the contents of the memories thus determined, producing the sum of the contents of these different memories and of the digital value of the signal at the instant under consideration, the results and sums being redirected into the corresponding memories.

5. A device according to claim 4, in which the content of each of the memories in the third series is transferred at the end of each emission to a magnetic tape with several tracks, each track corresponding to the different digits of each memory, the magnetic tape beginning to advance as soon as a third comparator registers equality between the time that has passed since the start of the emission and a predetermined time set in a subsidiary counter defining the total duration of emission, the said tape advancing for a fixed period of time, defined by a binary element, corresponding to the maximum time taken for the waves to travel through the medium.

6. A device according to claim 4, in which the number of memories in the third series depends on the number of separate groups of sensors to which the said device is connected, and in which a multiple-input cyclic contactor receives the electrical signals supplied by the groups of mechanical energy sensors, the said contactor cyclically switching the circuits of each group of sensors, receiving in turn for the duration of one basic time unit the samples of the instantaneous value of each of the electrical signals, transferring these samples to an analogue-to-digital converter converting the signal delivered by each group of sensors into a digital value and supplying the arithmetic unit with the sampled digital values, at the same time as the contactor is selecting each of the matching series of third-category memories, in order to link them up with the arithmetic unit.

7. A device according to claim 6, further comprising a series of said sensors, linked in parallel connected to provide the measured amplitudes.

8. A process for measuring and recording the amplitude of a seismic signal in the ground, comprising the steps of:

A. emitting a sequence of vibrational impulses into the ground to generate said seismic signal, the sequence having a predetermined time pattern, B. generating a train of synchronization pulse signals defining a corresponding train of elementary equal time intervals, C. sensing sample values of the amplitude of said seismic signal at instants in time defined by said synchronization pulse signals, D. converting the sample values thus sensed to digital values, E. measuring the elapsed time from the respective instants of emission of said vibrational impulses into the ground until the respective instants of sensing said sample values to determine the integral number of elementary time units which elapsed, F. totalling the respective digital sample values in a plurality of categories, each category including as addends all and only those samples which occurred a respective predetermined integral number of time units after the emission of any one of said vibrational impulses, the number of said categories being limited by an integral number of elementary time units sufficient to receive all reflected seismic signals of interest from a given vibrational impulse, and G. recording the totalled digital sample values from the respective categories after the complete predetermined time pattern of vibrational impulses have been emitted and the resulting seismic signals sampled.

9. A process for measuring and recording the amplitude of a received signal, comprising the steps of:

A. emitting a sequence of impulses to transmit said signal, the sequence having a predetermined time pattern, B. generating a train of synchronization pulse signals defining a corresponding train of elementary equal time intervals, C. sensing sample values of the amplitudes of said received signal at instants in time defined by said synchronization pulse signals, D. converting the sample values thus sensed to digital values, E. measuring the elapsed time from the respective instants of transmission of said impulses until the respective instants of sensing said sample values to determine the integral number of elementary time units which elapsed, F. totalling the respective digital sample values in a plurality of categories, each category including as addends all and only those samples which occurred a respective predetermined integral number of time units after the transmission of any one of said impulses, the number of said categories being limited by an integral number of elementary time units sufficient to receive all signals of interest from a given impulse, and G. recording the totalled digital sample values from the respective categories after the complete predetermined time pattern of impulses have been transmitted and the resulting seismic signals sampled.

10. A device for processing received signals which occur as a result of transmitted impulses, said impulses occuring not more than a predetermined time prior to said received signals, comprising;

A. clock means for generating a train of synchronization pulse signals defining a corresponding train of elementary equal time intervals, B. means responsive to said synchronization pulse signals for sensing sample values of said received signals at instants of time defined by said synchronization pulse signals, C. analog-to-digital conversion means for converting the sample values thus sensed to digital values, D. counter means responsive to said synchronization pulses for measuring the elapsed time from the respective instants of transmission of each of said impulses until the respective instants when said sample values are sensed to determine the integral number of elementary time units which have elapsed, E. a plurality of memory means for totalling the respective digital sample values in a corresponding plurality of categories, each category including as addends all and only those samples which occurred a respective predetermined integral number of time units after the transmission of any one of said impulses, the number of said categories and the corresponding number of said memory means being limited by an integral number of elementary time units sufficient to receive all signals of interest from a given impulse, and F. means for recording the totalled digital sample values from the respective categories after a complete predetermined time pattern of impulses have been transmitted and the resulting received signals sampled.

* * * * *